United States Patent
Filipek et al.

(10) Patent No.: US 8,074,620 B2
(45) Date of Patent: Dec. 13, 2011

(54) SPARK TO FLAME CONVERSION UNIT, SUCH AS EMPLOYED WITH AN EXISTING SPARK PLUG OR HEAT SOURCE SUPPLIED GLOW PLUG FOR ACCOMPLISHING MORE EFFICIENT PISTON COMBUSTION

(76) Inventors: Gerald Filipek, Washington, MI (US); Mark Plantrich, Ortonville, MI (US)

( * ) Notice: Subject to any disclaimer, the term of this patent is extended or adjusted under 35 U.S.C. 154(b) by 809 days.

(21) Appl. No.: 12/179,956

(22) Filed: Jul. 25, 2008

(65) Prior Publication Data

US 2009/0025670 A1     Jan. 29, 2009

Related U.S. Application Data

(60) Provisional application No. 60/951,866, filed on Jul. 25, 2007.

(51) Int. Cl.
*F02P 15/00* (2006.01)
*F02P 21/00* (2006.01)

(52) U.S. Cl. ............ 123/266; 123/285; 123/143 B

(58) Field of Classification Search ............ 123/266, 123/261, 285, 286, 143 B, 143 R, 169 R, 123/144
See application file for complete search history.

(56) References Cited

U.S. PATENT DOCUMENTS

| | | | |
|---|---|---|---|
| 942,886 A | 12/1909 | Carter | |
| 2,456,080 A | 12/1948 | Wu Pe | |
| 4,098,232 A * | 7/1978 | Gleiter | 123/261 |
| 4,122,805 A * | 10/1978 | Kingsbury et al. | 123/255 |
| 4,218,993 A * | 8/1980 | Blackburn | 123/143 B |
| 4,224,902 A | 9/1980 | Binder et al. | |
| 4,345,555 A | 8/1982 | Oshima et al. | |
| 4,977,873 A | 12/1990 | Cherry et al. | |
| 5,109,817 A | 5/1992 | Cherry | |
| 5,203,298 A | 4/1993 | Manolis | |
| 5,230,313 A | 7/1993 | Bisel et al. | |

(Continued)

FOREIGN PATENT DOCUMENTS

DE    102008062572 A1 *  6/2010

(Continued)

OTHER PUBLICATIONS

SmartPlugs Article http://smartplugs.com.

*Primary Examiner* — Hieu T Vo
(74) *Attorney, Agent, or Firm* — Gifford, Krass, Sprinkle, Anderson & Citkowski, P.C.

(57) ABSTRACT

A pre-chamber for use with a spark plug or glow plug, the chamber being secured at an upper end attachable unit associated with an internal combustion cylinder. The pre-chamber is designed to promote faster ionization resulting in more efficient spark to flame ignition (due to voltage buildup being delayed until a generated spark jumps the gap), or beat to flame ignition (due to the introduction temperature of the injected plasma) and, in each instance, results in faster propagation of flame within the compressed cylinder, thereby achieving more efficient and consistent (cycle to cycle) output in combination with lower exhaust temperatures. A plurality of outlet ports are defined, such as perimeter/radially extending fashion, in an outlet end of the pre chamber body and communicate the combusted fuels as a plurality of flame outlets with a remaining volume of atomized fuel within the combustion chamber during a power outlet stroke.

13 Claims, 3 Drawing Sheets

U.S. PATENT DOCUMENTS

| | | | |
|---|---|---|---|
| 5,293,851 A | 3/1994 | Schaub | |
| 5,297,518 A | 3/1994 | Cherry | |
| 5,392,744 A | 2/1995 | Regueiro | |
| 5,421,299 A | 6/1995 | Cherry | |
| 5,421,300 A * | 6/1995 | Durling et al. | 123/266 |
| 5,533,476 A | 7/1996 | Anderson | |
| 5,662,082 A | 9/1997 | Black et al. | |
| 5,904,127 A | 5/1999 | Kemmler et al. | |
| 5,924,402 A | 7/1999 | Regueiro | |
| 6,019,081 A | 2/2000 | Divecha et al. | |
| 6,213,085 B1 | 4/2001 | Durling et al. | |
| 6,293,232 B1 | 9/2001 | Allen | |
| 6,359,377 B1 * | 3/2002 | Durling | 313/141 |
| 6,401,674 B2 | 6/2002 | Allen | |
| 6,513,483 B2 | 2/2003 | Riggs | |
| 6,843,220 B2 | 1/2005 | Lausch et al. | |
| 6,854,438 B2 | 2/2005 | Hilger et al. | |
| 6,854,439 B2 | 2/2005 | Regueiro | |
| 7,021,275 B2 | 4/2006 | Durling | |
| 2003/0196634 A1 | 10/2003 | Lausch et al. | |
| 2003/0213461 A1 | 11/2003 | Regueiro | |
| 2009/0266325 A1 | 10/2009 | Kumar et al. | |
| 2010/0132666 A1 | 6/2010 | Sato et al. | |

FOREIGN PATENT DOCUMENTS

| | | |
|---|---|---|
| EP | 0172954 | 3/1986 |
| EP | 0913897 B1 | 5/1999 |
| JP | 56075970 A | 6/1981 |
| JP | 57024412 A | 2/1982 |
| JP | 06066236 A | 3/1994 |
| JP | 2000110697 A | 4/2000 |
| WO | WO-9314643 | 7/1993 |
| WO | WO-2006054009 A1 | 5/2006 |

* cited by examiner

SPARK TO FLAME CONVERSION UNIT, SUCH AS EMPLOYED WITH AN EXISTING SPARK PLUG OR HEAT SOURCE SUPPLIED GLOW PLUG FOR ACCOMPLISHING MORE EFFICIENT PISTON COMBUSTION

CROSS-REFERENCE TO RELATED APPLICATIONS

This Application is a Non-Provisional of Provisional (35 USC 119(e)) application 60/951,866 filed on Jul. 25, 2007.

FIELD OF THE INVENTION

The present inventions are directed to devices and techniques for achieving faster ionization of a spark generating plug or other heat input source such as associated with a glow plug or the like. The spark plug or glow plug is secured within a spark to flame (stf) pre-ignition chamber, this in turn defining an upper end attachable unit associated with an internal combustion cylinder. In this instance of a spark plug, faster ionization results in more efficient spark to flame ignition (due to voltage buildup being delayed until a generated spark jumps the gap) and resultant faster propagation of the flame within a compressed cylinder, thereby achieving more efficient and consistent (cycle to cycle) output in combination with lower exhaust temperatures. A plurality of outlet ports are defiled, such as perimeter/radially extending fashion, in an outlet end of the stf body and communicate the combusted fuels as a plurality of flame outlets with a remaining volume of atomized fuel within the combustion chamber during a power outlet stoke.

BACKGROUND OF THE INVENTION

The prior art is well documented with various types of ignition devices in use with an internal combustion engine cylinder. The most conventional type of ignition device is the spark plug which, upon being installed within a top end location of the cylinder, issues an iterative spark for igniting reactants or combustion (atomized fuel and air) which are compressed between a piston driven cylinder bead and the top end of the cylinder.

In operation, and upon sending an ignition signal to a traditional spark plug, the plug begins to ionize the spark gap. Ionization is defined as the physical process of converting an atom or molecule into an ion (e.g. and which is further defined as an atom or molecule which has lost or gained one or more valence electrons, thereby giving it a positive or negative electrical charge).

During the ionization phase, lasting about 5-6 millionths of a second, an incoming (build-up) voltage is momentarily stranded (by virtue of the spark gap not yet having been established) and, as a result, heats up ignition components including the spark plug. This action results in both wasted energy and ignition time. Upon the ignition voltage overcoming the resistance in the spark gap, a spark is created and discharged, according to a given intensity such as approximately 50 watts. The spark must ignite within the compressed and atomized reactants of combustion contained with the cylinder and in order to ignite the combustion chamber.

Known disadvantages associated with conventional spark plugs include the tendency of the plug ignition to reactant combustion firing timing often being out of step with an optimal (near or at) top dead center position established between the piston driven cylinder bead and cylinder. Other disadvantages associated with conventional spark plug ignition includes the tendency of the subsequent cylinder combustion to occur incompletely, resulting in wasted reactants discharged through the cylinder exhaust cycle and less than optimal power delivery to the crankshaft or other work output mechanism connected to the cylinder head connected crank.

Other attempts have been made to substitute conventional spark plugs with a replacement unit, and in the attempt to more effectively ignite a fuel-air mixture. Such ignition devices include such as a pre-chamber flame distributing igniter for projecting a burning plasma into an engine combustion chamber and reference is made to Cherry U.S. Pat. Nos. 4,977,873, 5,109,817, 5,297,518 and 5,421,299. Additional types of directed jet, or torch jet, spark plug designs are disclosed in Durling U.S. Pat. Nos. 7,021,275, 5,421,300 and 6,213,085.

SUMMARY OF THE INVENTION

The present inventions are directed to devices and techniques for achieving faster ionization of a spark generating plug or other heat input source such as associated with a glow plug or the like. More particularly, a spark to flame (stf) or heat to flame (htf) pre-ignition chamber is secured to an upper end location of a cylinder associated with an internal combustion engine.

In use with a conventional spark plug, the stf chamber encourages faster ionization/voltage buildup within the plug, resulting from such as an excising ignition coil sending a standard pulse of high voltage to the plug, with resultant faster sparking at lower temperature (e.g. again as a result of lesser voltage buildup time at the plug gap). The faster ionization and sparking (measured in one non-limiting instances ranging from such as 30% to 50%) results in decreased heat buildup and less wasted energy.

Ignition of the compressed reactants of combustion forced into stf chamber by the adjoining cylinder results in high speed jets of combusted flame being created and discharged, such as in a swirl induced pattern, through an array or peripherally (and optionally angled) output ports defined at a lower end location of the stf chamber and into the charged-compressed cylinder. In contrast to creating conventional spark ignition within the compressed cylinder, use of the stf (pre) chamber results in high speed jets of flame creating a significantly faster (both in terms of velocity and acceleration and which can also exceed 30% to 50% over existing spark plug applications) flame front (or plume), the associated burn rate delivering higher torque and power with less cycle to cycle variations.

Faster ionization results in more efficient spark to flame ignition (due to voltage buildup being delayed until a generated spark jumps the gap) and resultant faster propagation of the flame within a compressed cylinder, thereby achieving more efficient and consistent (cycle to cycle) output in combination with lower exhaust temperatures. A plurality of outlet ports are defined, such as perimeter/radially extending fashion, in an outlet end of the stf body and communicate the combusted fuels as a plurality of flame outlets with a remaining volume of atomized fuel within the combustion chamber during a power outlet stroke.

In another variant, a glow plug substitutes for the spark plug and is secured within a heat to flame (htf) pre-ignition chamber, this generally corresponding to the stf chamber utilized with the spark plug, and which in turn again defines an upper end attachable unit associated with an internal combustion cylinder. Plasma or another other high temperature heat source is communicated to the glow plug, and into the pre-chamber. Upon compression of the atomized (fuel) reactants within the associated cylinder, ignition of the heated/compressed gases occurs (typically again faster than in comparison to standard spark plug ignition) within the pre-chamber, thus igniting the gases within the compressing piston combustion chamber. A torsionally generated swirl (or again plume) is created within the pre-chamber and the created jets of flame are discharged in a rapidly accelerating and propagating fashion through the plurality of angled and perimeter defined outlets, this again resulting in more even burning (with reduced emissions), consistent power output (cycle to cycle) with higher efficiency/lower exhaust temperature.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

As described previously, the present invention is directed to devices and techniques for achieving faster ionization of a spark generating plug or other heat input source such as associated with a glow plug or the like. More particularly, and as will be described in further detail below, the present inventions are directed to applications including either a spark to flame (stf) pre-chamber (FIGS. 1-4) or a heat to flame (htf) pre-chamber (FIGS. 5 and 6A-6C) secured to an upper end location of a cylinder associated with an internal combustion engine. As will also be described in additional detail, the spark to flame or heat to flame pre-chamber bodies are each capable of being threadably, or otherwise, engaged into a top end location of a combustion chamber and, in use, igniting a compressed and atomized fuel such as ethanol, various octane grades of gasoline, diesel, bio-fuels or the like, to cause faster, more even burning ignition and flame/plume propagation resulting in increased power output and more consistent cycle to cycle operation.

Figure 1:
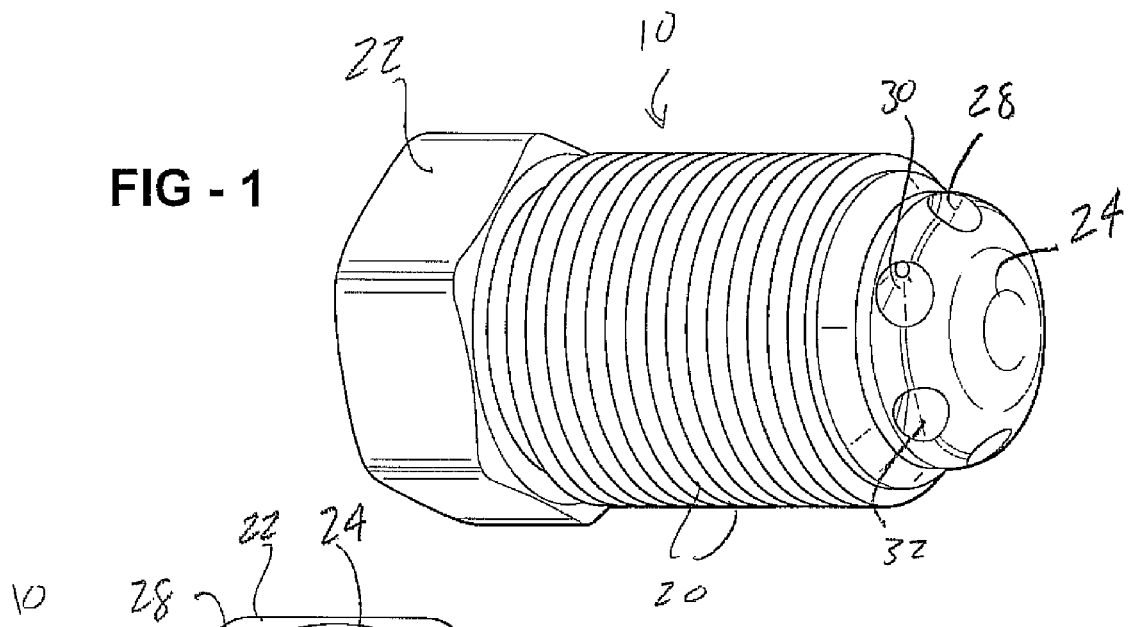
FIG. 1 is a perspective view of a spark to flame pre-ignition chamber according to a first embodiment, such as capable of being secured to a top end communicating location of a cylinder, and exhibiting a plurality of circumferentially arrayed and swirl inducing flared flame ports.
Figure 2:
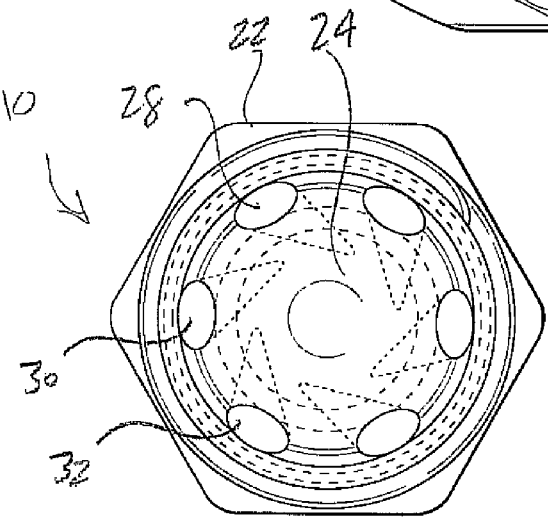
FIG. 2 is an end view of the stf chamber in FIG. 1 and better illustrating the angled and swirl-inducing configuration of the outlet flame ports.
Figure 3:
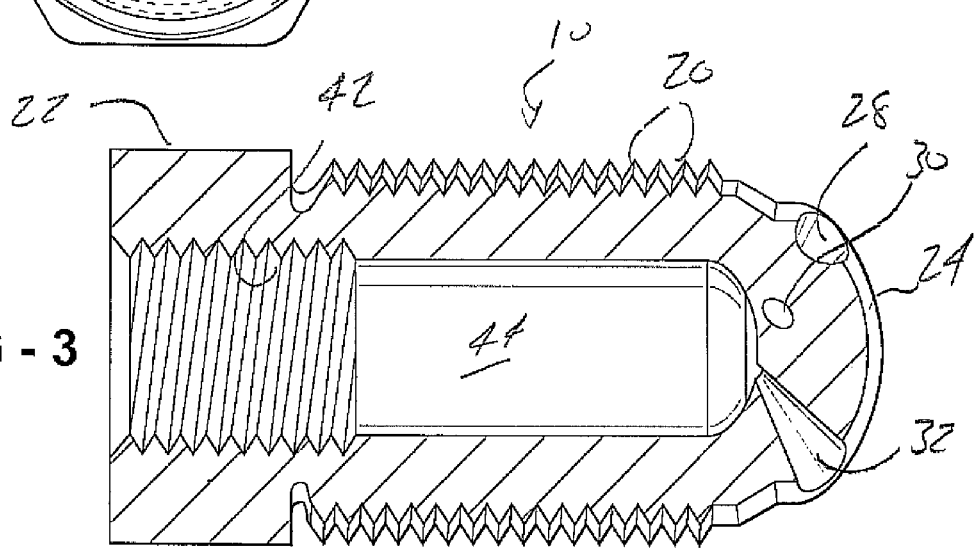
FIG. 3 is a lengthwise cutaway view of the stf chamber and illustrating the interiorly threaded end for receiving a conventional spark plug.
Figure 4:
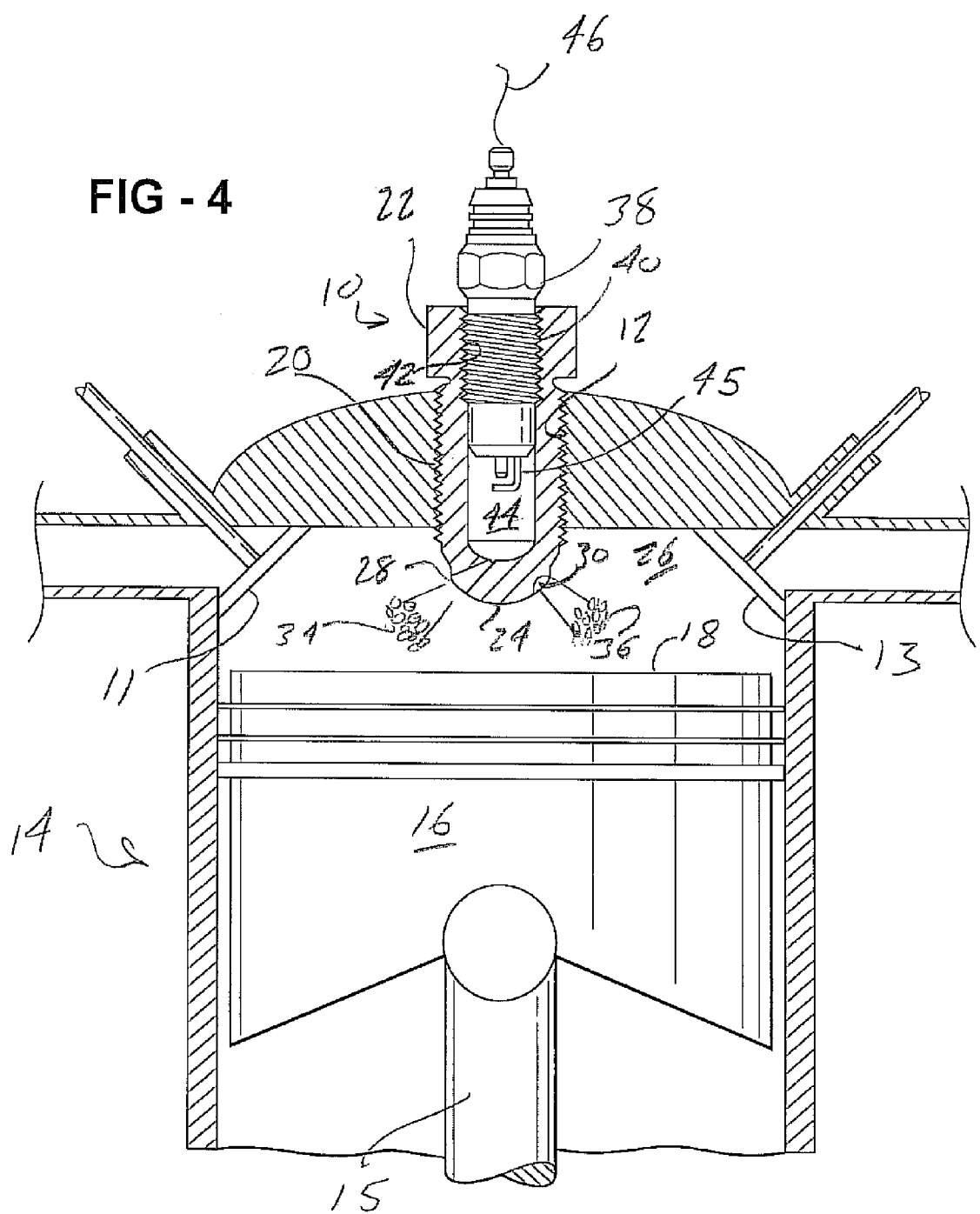
FIG. 4 is an environmental view showing the stf chamber secured to an upper end location in communication with an interiorly threaded opening associated witli a cylinder.

Referring to FIGS. 1-4, a series of perspective, end plan, lengthwise cutaway and environmental views are shown of a spark to flame pre-ignition element 10 according to a first embodiment, and such as which is capable of being secured to a top end communicating location (see internally threaded area 12 in FIG. 4) of an internal combustion cylinder 14. As best shown in FIG. 4, the cylinder 14 supports in an internally reciprocating fashion a piston 16 defining an end face 18 and which is movable in directions towards and away from the pre-ignition body 10 secured to the upper end location of the housing within which the cylinder is located. Other features associated with a conventionally operating (such as four stroke) cylinder function according to the general depiction in FIG. 4 are shown, these notably including such as intake 11 and exhaust 13 valves, piston rod 15 connected to crankshaft (not shown) and the like, however further technical description of normal cylinder operation is unnecessary for purposes of the present description.

As illustrated, the pre-ignition element 10 is constructed of a solid material, such as a metal or other suitable and heat resistant composition, and includes a plurality of exteriorly disposed threads 20 spiraling along its intermediate length. The exterior threads 20 mate with the internally defined and upper end accessible threads 12 formed into the upper end accessible and seating location of the cylinder 14 and permit the body 10 to be installed (see FIG. 4) in a linearly adjustable fashion within the seating location.

The pre-ignition body 10 also includes a further hex shaped end, at 22, for facilitating installation of the body 10 to the top end of the cylinder 14, as well as a second, generally bulbous end 24 which, when mounted in place, projects within an upper end location of a cylinder interior 26 (see FIG. 4). A plurality of outlet ports 28, 30, 32, et. seq., are defined, such as perimeter/radially extending fashion, in the outlet end 24 of the pre-chamber body.

As will be described in subsequent detail, the ports 28, 30, 32 (such as illustrating a total of six such ports but also understanding that any plurality can be employed) communicate pre-combusted (such as spark to flame ignited) fuel through the plurality of flame outlets, wherein a remaining volume of atomized and compressed fuel reactants within the combustion chamber are ignited and expanded during a power outlet stroke. As further shown, the ports 28, 30, 37 each exhibit an expanding/outwardly flared pattern, the purpose of which being to initiate a torsional (twisting) and rapidly expanding ignition plume, see as referenced at 34 and 36 in FIG. 4, this in turn causing the compressed reactants within the cylinder 14 (such as resulting from an approaching top dead center position of the reciprocating piston 16) to rapidly expand and more evenly ignite a remaining volume of compressed reactants contained within the cylinder interior 26.

A conventional spark plug, see at 38 in FIG. 4, exhibits exterior threads 40 which, upon pre-installation of the body 10, enable the plug 38 to be matingly and threadably engaged within additional interior threads 42 extending proximate the hex headed end 22 and in communicating fashion with an open interior 44 of the pre-ignition element 10. The interior chamber 44 operates in the indicated embodiment as a spark to flame (stf) chamber in communication with the radially/angled outlet ports 28, 30, 32. The spark plug 38, as conventionally depicted, exhibits a spark generating end 45, this extending within the interior chamber 44 a selected (and adjustable) distance in the manner illustrated in FIG. 4.

Consistent with the description of normal spark plug operation, cylinder compression (such as to the TDC position approximated in FIG. 4) results in faster ionization/voltage buildup within the plug 38, this further resulting from such as an excising ignition coil or the like (see as referenced at 46 in FIG. 4) sending a standard pulse of high voltage to the plug 38. Frictional forces existing between compressed gases create a static charge and, as a result, an ionic field conducive to arcing needs to be established.

The spark to flame pre-chamber 44 operates in combination with the spark compressed reactants forced into the pre chamber 44 are ignited faster and at a lower temperature (e.g. again as a result of lesser voltage buildup time at the plug gap). The faster ionization and sparking (measured in one non-limiting instances ranging from such as 30% to 50%) results in decreased beat buildup (such as 100° F.), and in turn results in less wasted energy.

Ignition of the compressed reactants of combustion forced into stf pre chamber 44 by the adjoining cylinder 14 results in high speed jets of combusted flame being created and discharged, such as in the swirl induced pattern referenced at 34 and 36 associated with the multiple outlet ports 28, 30, 32 and into the charged-compressed cylinder interior 26. In contrast to creating conventional spark ignition within the compressed cylinder, use of the stf (pre) chamber results in high speed jets of flame creating a significantly faster (both in terms of velocity and acceleration and which can also exceed 30% to 50% over existing spark plug applications) flame front (or plume), the associated burn rate delivering higher torque and power with less cycle to cycle variations.

Faster ionization, such as provided by the stf unit utilized in combination with the conventional spark plug, results in more efficient spark to flame ignition (due to voltage buildup being delayed until a generated spark jumps the gap) and resultant faster propagation of the flame within a compressed cylinder 14, thereby achieving more efficient and consistent (cycle to cycle) output in combination with lower exhaust temperatures. Faster ionization is made possible by virtue of the spark to flame chamber being sized much smaller than the adjoining cylinder interior 26, thereby providing less resistance to overcome in creating the spark. Lineal readjustment of the spark plug 38 within the pre-chamber 44, and in particular the positioning of the sparking end 45 relative to the inner chamber 44, further modifies the flame/plume ignition characteristics generated.

The spark created at location 45 ignites within the (stf) chamber 44, which then discharges the high speed jets of flame into the combustion chamber, and thereby to ignite the compressed fuel vapor, such ignition plume growing and accelerating in a torsional/twisting fashion at any (e.g. speed and/or acceleration) factor of 1 to 2 times greater (or more) than that achieved with the speed of ignition of a spark plug alone. The spark to flame chamber generates a much larger flame than with conventional spark plugs, this resulting in more even, complete and faster burn time of the available fuel vapors. With increased cylinder pressure, the piston 16 is expanded (pushed) down with more force, in turn creating more crankshaft torque for faster output, more liveliness to the throttle, and more power to such as the vehicle's wheels. Even when additional generated torque is not employed to travel faster, the engine performs its work with less effort, resulting in better fuel efficiency.

Another advantage of the present design is in reducing cycle-to-cycle variation of the cylinder, and which is inherent to some degree as a result of such factors as the dynamics of combustion, load, fuel quality, mixture of air to fuel and other combustion related variables. Such variables can cause a spark plug to generate a weak spark and, in a worst case, cylinder misfiring. Variability in ignition timing can reduce cylinder output efficiency by upwards of 10%. Use of spark to flame ignition to ignite fuel more precisely, results in reduced cycle-to-cycle variation by upwards of 50%, with corresponding contribution to overall fuel efficiency.

Figure 5:
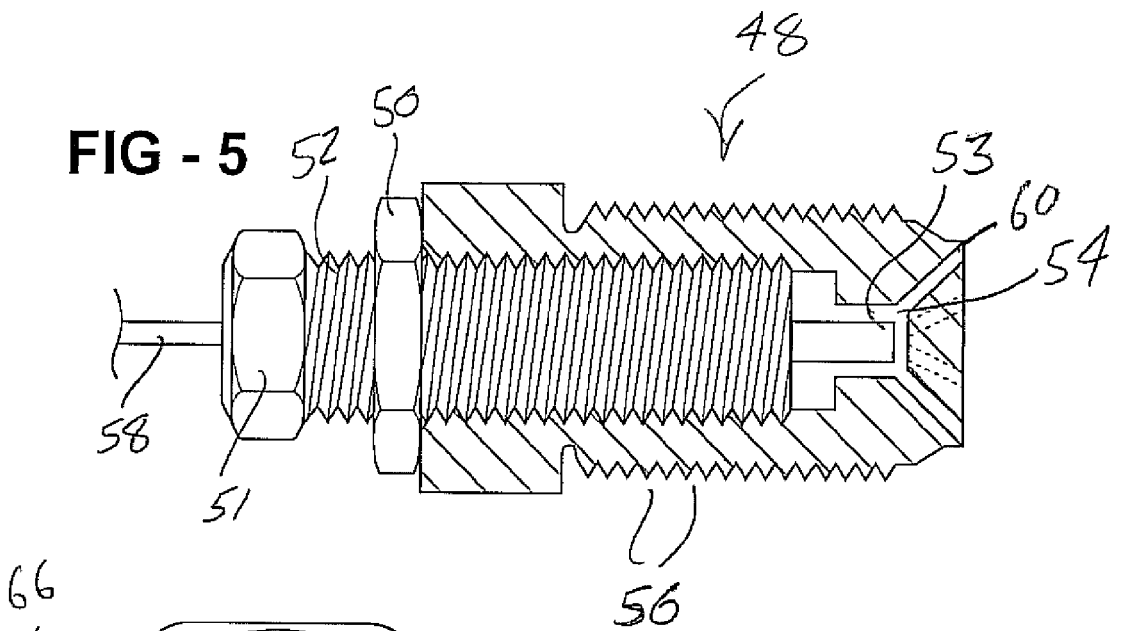
FIG. 5 is a plan view illustration in cutaway of a glow plug with insertion adjustable lock nut for adjusting the position of the plug relative to pre-ignition chamber for creating a heat to flame propagation swirl profile within the glow plug.
Figure 6A:
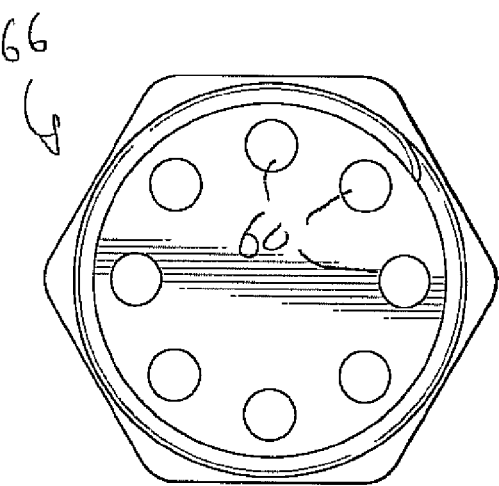
FIGS. 6A-6C illustrate potential flame port configurations associated with the glow plug variant of FIG. 5.
Figure 6B:
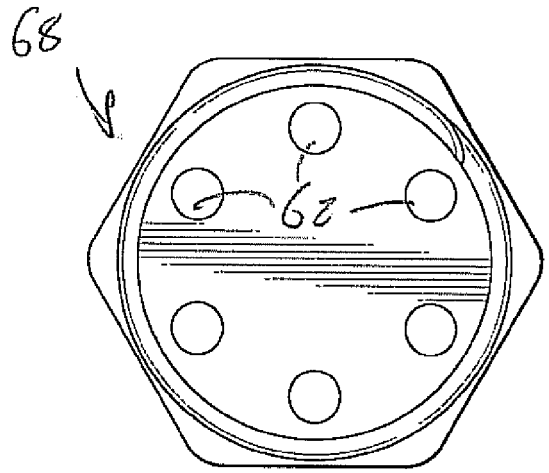
Figure 6C:
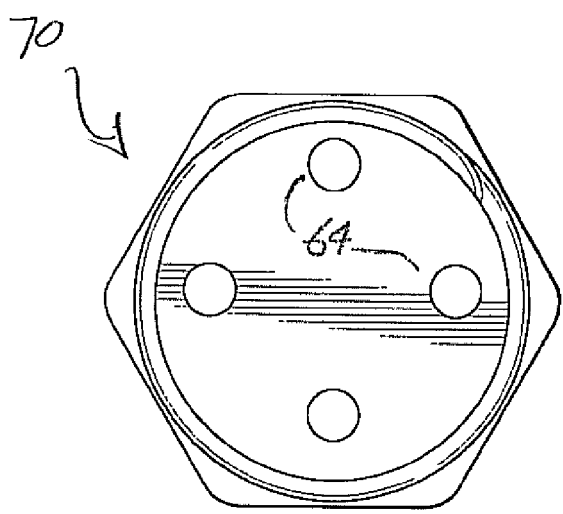

Referring now to FIG. 5, a plan view is shown at 48 in cutaway of a pre-ignition element in the form of a heat to flame unit according to a further preferred embodiment, and exhibiting an insertion adjustable lock nut 50 for adjusting the position of a threadably engageable glow plug 52 exhibiting a nozzle end 53 relative to an interiorly threaded pre-ignition chamber 54 established within a heat to flame (htf) transfer unit associated with the glow plug for creating a heat to flame propagation swirl profile. As with the spark to flame unit 10 disclosed in FIG. 1, a plurality of exteriorly defined threads 56 are defined about an exterior periphery of the unit 48 and enable the same to be threadably engaged to the interiorly threaded location (see again at 12 in FIG. 4) associated with the top end accessible location of the cylinder 14.

The glow plug 52 substitutes for the spark plug 38 and is threadably secured (see hex headed end 51) within the heat to flame (htf) pre-ignition chamber 48, this generally corresponding to the stf chamber 10 utilized with the spark plug 38, and which in turn again defines an upper end attachable unit associated with an internal combustion cylinder 14. Plasma or another other high temperature heat source is communicated (see via line 58) to the glow plug 52, and into the pre-chamber 54.

Upon compression of the atomized (fuel) reactants within the associated cylinder, ignition of the heated/compressed gases occurs (typically again faster than in comparison to standard spark plug ignition) within the pre-chamber 54, thus in turn igniting the gases within the compressing piston combustion chamber. A torsionally generated swirl (or again plume) is created within the pre-chamber 54, the created jets of flame being discharged in a rapidly accelerating and propagating fashion through a plurality of angled and perimeter defined outlets. Reference is made to patterns 60, 62 and 64 of apertures (ranging from four, six and eight as illustrated) in each of FIGS. 6A, 6B and 6C, these associated with corresponding modifications 66, 68 and 70 of heat to flame units. This again results in more even burning (with reduced emissions), consistent power output (cycle to cycle) with higher efficiency/lower exhaust temperature.

Aside from the general operation of the heat to flame unit 48, linear readjustment of the threadably engaged glow plug 52, as facilitated by the lock nut 50, correspondingly adjusts for different cycles (e.g. 2 or 4 cycle engines), varying engine compression rates and fuel types. The operating temperatures of the glow plug 52 can further be varied by modulating the properties of the input plasma or other heat source fed into line 58.

Having described our invention, other and additional preferred embodiments will apparent to those skilled in the art to which it pertains, and without deviating from the appended claims.

We claim:

1. An ignition device incorporated into a cylinder containing a reciprocating piston, said device comprising:
   a body affixed to an upper end location of the cylinder and defining a pre-ignition chamber in communication with an interior of the cylinder;
   an ignition element engaged within said body in communication with said pre-ignition chamber; and
   a plurality of outlet ports defined in an end of said body opposite said ignition element and, upon igniting pressurized reactants forced into said pre-ignition chamber, creating an ignition plume communicating through said ports and combusting a remaining volume of compressed reactants within the cylinder interior during a power outlet stroke of the piston.

2. The device as described in claim 1, said body further comprising a spark to flame transfer unit within which is engaged a spark plug.

3. The device as described in claim 2, further comprising a plurality of threads defined along an interior of said spark to flame transfer unit and within which the spark plug is threadably and linearly adjustably engaged.

4. The device as described in claim 1, said body further comprising a heat to flame transfer unit, within which is engaged a glow plug.

5. The device as described in claim 4, further comprising a plurality of threads defined along an interior of said heat to flame transfer unit and within which the glow plug is threadably and linearly adjustably engaged via a lock nut.

6. The device as described in claim 1, said body further comprising a plurality of exterior annular threads, a further plurality of interior threads defined along an opening associated with the upper end location of the cylinder and within which said body is threadably engaged.

7. The device as described in claim 1, said plurality of outlet ports having a specified shape and size and being configured in a generally annular and twisting fashion.

8. An ignition device incorporated into a cylinder containing a reciprocating piston, said device comprising:
   a body affixed to an upper end location of the cylinder and defining a pre-ignition chamber in communication with an interior of the cylinder, said body further comprising a spark to flame transfer unit;
   a spark plug threadably engaged within said body in communication with said pre-ignition chamber; and
   a plurality of outlet ports defined in an end of said body opposite said spark plug and configured in a generally annular and twisting fashion;
   upon the spark plug igniting pressurized reactants forced into said pre-ignition chamber, an ignition plume communicates through said ports and combusts a remaining volume of compressed reactants within the cylinder interior during a power outlet stroke of the piston.

9. The device as described in claim 8, said body further comprising a plurality of exterior annular threads, a further plurality of interior threads defined along an opening associated with the upper end location of the cylinder and within which said body is threadably engaged.

10. The device as described in claim 8, further comprising a plurality of threads defined along an interior of said spark to flame transfer unit and within which the spark plug is threadably and linearly adjustably engaged.

11. An ignition device incorporated into a cylinder containing a reciprocating piston, said device comprising:
   a body affixed to an upper end location of the cylinder and defining a pre-ignition chamber in communication with an interior of the cylinder, said body further comprising a heat to flame transfer unit;
   a glow plug threadably engaged within said body in communication with said pre-ignition chamber; and
   a plurality of outlet ports defined in an end of said body opposite said glow plug and configured in a generally annular and twisting fashion;
   upon the glow igniting pressurized reactants forced into said pre-ignition chamber, an ignition plume communicates through said ports and combusts a remaining volume of compressed reactants within the cylinder interior during a power outlet stroke of the piston.

12. The device as described in claim 11, said body further comprising a plurality of exterior annular threads, a further plurality of interior threads defined along an opening associated with the upper end location of the cylinder and within which said body is threadably engaged.

13. The device as described in claim 11, further comprising a plurality of threads defined along an interior of said heat to flame transfer unit and within which the glow plug is threadably and linearly adjustably engaged.

* * * * *

UNITED STATES PATENT AND TRADEMARK OFFICE
CERTIFICATE OF CORRECTION

PATENT NO.       : 8,074,620 B2  
APPLICATION NO.  : 12/179956  
DATED            : December 13, 2011  
INVENTOR(S)      : Gerald A. Filipek et al.

Page 1 of 1

It is certified that error appears in the above-identified patent and that said Letters Patent is hereby corrected as shown below:

In the Specification:

At column 1, line number 28 delete "defiled" insert --defined--.

At column 1, line number 32 delete "stoke" insert --stroke--.

At column 1, line number 42 delete "bead" insert --head--.

At column 1, line number 66 delete "bead" insert --head--.

At column 3, line number 33 delete "witli" insert --with--.

At column 4, line number 37 delete "37" insert --32--.

At column 5, line number 7 delete "beat" insert --heat--.

Signed and Sealed this  
Sixth Day of November, 2012

David J. Kappos  
*Director of the United States Patent and Trademark Office*